E. M. RICHARDSON.
VEHICLE TIRE.
APPLICATION FILED FEB. 15, 1912.
1,127,517.
Patented Feb. 9, 1915.
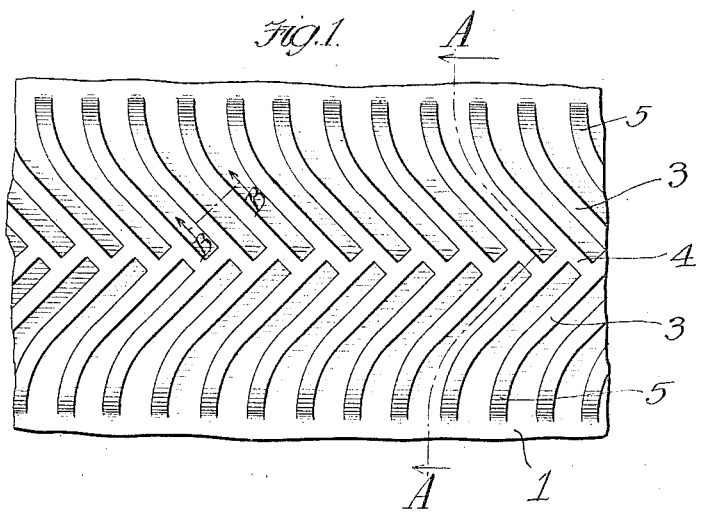
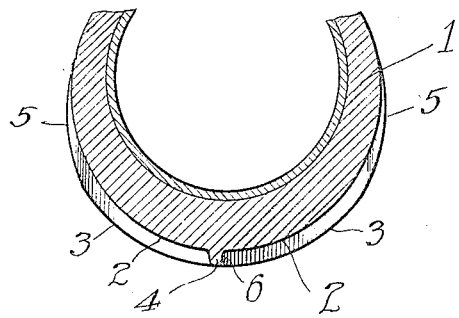
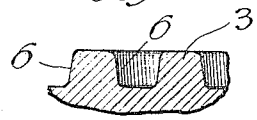
Witnesses
Martin H. Olsen.
Edwin Phelps
Inventor
Edward M. Richardson
By Rummler & Rummler
Attys.

UNITED STATES PATENT OFFICE.

EDWARD M. RICHARDSON, OF CHICAGO, ILLINOIS, ASSIGNOR OF ONE-HALF TO FRED E. HAMMOND, OF CHICAGO, ILLINOIS.

VEHICLE-TIRE.

1,127,517.       Specification of Letters Patent.        Patented Feb. 9, 1915.

Application filed February 15, 1912. Serial No. 677,675.

*To all whom it may concern:*

Be it known that I, EDWARD M. RICHARDSON, a citizen of the United States of America, and a resident of Chicago, county of Cook, State of Illinois, have invented certain new and useful Improvements in Vehicle-Tires, of which the following is a specification.

The main objects of this invention are to provide improvements in the conformation of the tread surfaces of vehicle tires, particularly those intended for use on motor driven vehicles, whereby the tire will effectively resist either circumferential slipping or transverse skidding; to provide a tread surface of such form that the projections thereof will be of relatively large extent, and, therefore, of great strength although presenting a large number of shoulders to the road-way to provide large tractive resistance.

An illustrative embodiment of this invention is shown in the accompanying drawing, in which:

Figure 1 is a developed fragmentary plan of the tread surface of the tire. Fig. 2 is a transverse section of the same taken on the line A—A of Fig. 1. Fig. 3 is a fragmentary transverse section taken on the line B—B.

In the form shown in the drawings the body 1 of the tire may be of any usual form, and the tread 2 is provided with outwardly projecting ridges 3 disposed at an angle to the circumferential center line of the tire. These are preferably disposed at approximately 45° to the center line of the tread throughout the greater part of their length, so as to provide equal resistance against either circumferential or transverse skidding. The transverse ridges 3 are spaced apart at equal intervals and those on opposite sides of the center line are arranged in staggered relation and are extended across the center line so as to provide in effect a middle zigzag rib 4 extending circumferentially around the tire. The lateral extremities of the ribs 3 are bent at an angle to the middle portions thereof, and are disposed at substantially right angles to the center line of the tread. This gives them comparatively large tractive power when the tire has sunk into mud or sand. The outer extremities 5 of the transverse ribs are also gradually reduced in height until they merge into the side wall of the tire.

It will be seen from Fig. 3 that each of the ribs 3 has a substantially flat outer surface extending throughout the greater part of its width, and its sides 6 are inclined so as to diverge from each other toward the body of the tire. The spaces between the ribs are, therefore, wider at the outside than they are adjacent to the body of the tire, so that dirt entering the spaces will readily fall out as the wheel revolves. All edges of the ribs are slightly rounded, and the concave angles are filleted.

Although but one specific embodiment of this invention has been herein shown and described, it will be understood that some of the details of the construction shown may be altered or omitted without departing from the spirit of this invention as defined by the following claim.

I claim:

A vehicle tire comprising a body portion having on its thread surface a plurality of ridges in herringbone arrangement, each disposed at an angle to the circumferential center line of the tread to prevent tractive or longitudinal skidding, the ridges on opposite sides of said center line being disposed in staggered relation to each other, and the inner ends of said ridges being crossed and merged into one another to form a continuous central peripheral ridge of zigzag form, the innermost portion of each ridge bracing the inner portion of the opposite coöperating ridge against lateral stress, through its jointure therewith.

Signed at Chicago this 12th day of February 1912.

EDWARD M. RICHARDSON.

Witnesses:
FRED E. HAMMOND,
EUGENE A. RUMMLER.